Patented Nov. 3, 1953

2,657,992

UNITED STATES PATENT OFFICE 2,657,992

MANGANOUS FERROUS PHOSPHATE COMPOSITION

Willard H. Woodstock, Crete, Ill., assignor to Victor Chemical Works, a corporation of Illinois No Drawing. Application April 13, 1950, Serial No. 155,779

8 Claims. (Cl. 99—2)

1

This invention relates to a manganous ferrous phosphate composition, and a method of producing the same.

The product ferrophosphorus is a well known article of commerce, but heretofore it has been difficult to produce soluble salts therefrom which are usable directly. Heretofore ferrophosphorus has been reacted with substances like soda ash to produce alkali metal salts which then had to be leached from the reaction mass to be put into commercial form.

The present invention provides a method and a product by which direct use can be made of ferrophosphorus to produce directly available materials without the necessity of undergoing a leaching process. In other words, substantially the entire reaction mass, including the iron, may be put into an acid soluble form.

This is accomplished by reacting the ferrophosphorus with manganese dioxide (which may be in its crude form as pyrolusite). In the reaction product the iron, manganese and phosphorus are in available form, directly useful as a mineral supplement in stock feeds, for example, as well as for other purposes such as rust proofing compositions and as a source of available manganese in fertilizer compositions. The reaction product may, of course, be utilized by reaction with acids to produce desired iron and manganese salts.

The term "ferrophosphorus" includes a number of different iron phosphides, or mixtures thereof, and it is usually produced in the production of phosphorus by thermal methods. Commercially available ferrophosphorus will range in phosphorus content from about 18 to 27%, generally from about 22 to 25%.

Pyrolusite is a naturally occurring manganese ore, generally containing about 80 to 90% manganese dioxide ($MnO_2$). Manganese ores containing much lower contents of manganese dioxide may be employed, although in general such ores are less desirable than those having an 80% or higher $MnO_2$ content.

Both ferrophosphorus and pyrolusite are insoluble in phosphoric acid and are not easily converted to iron and manganese phosphate salts by any simple procedure. This difficulty can be overcome by means of the present invention in that the reaction product of the present invention is readily soluble in phosphoric and other inorganic acids. The iron and manganese salts may be crystallized from such acid solutions in the form of substantially pure salts.

In the production of the reaction product of the present invention it is possible to employ any of the commercial grades of ferrophosphorus and pyrolusite. It is not necessary to accurately proportion the amounts of the ferrophosphorus and manganese dioxide since these materials will react in various proportions yielding a product in which the manganese, iron and phosphorus are readily available in acid soluble form. The reaction is believed to result from the reduction of $MnO_2$ to $MnO$ and the oxidation of the ferrophosphorus to $P_2O_5$ and various oxides of iron combined in the form of complex acid soluble phosphate salts. The reaction is self-contained, requiring no additional reagents other than the two components, manganese dioxide and ferrophosphorus. Within the proportion range of 5 to 11 mols of manganese dioxide to 2 mols of ferrophosphorus the reaction is ordinarily self-supporting requiring ignition only to start the reaction, though additional heat may be desirable in some cases to speed up the reaction. In general the reaction is relatively slow when the proportions are $11MnO_2$ to $2Fe_2P$, but quite rapid when the proportions are $5MnO_2$ to $2Fe_2P$. The lowest theoretical proportions I contemplate using are $5MnO_2$ to $4Fe_2P$, as illustrated by the following equation:

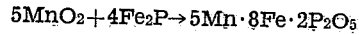
$$5MnO_2 + 4Fe_2P \rightarrow 5Mn \cdot 8Fe \cdot 2P_2O_5$$

However, the preferred proportions and reaction are illustrated in the following typical equation:

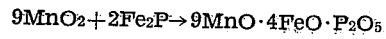
$$9MnO_2 + 2Fe_2P \rightarrow 9MnO \cdot 4FeO \cdot P_2O_5$$

The reaction product is in the form of a homogeneous clinker and, as illustrated by the two equations, may vary in composition depending on the relative ratios of the manganese, iron, phosphorus and oxygen in the starting reactants.

In one method of carrying out the invention, the ferrophosphorus and pyrolusite are finely ground and intimately mixed. The mixture is then ignited, starting the exothermic reaction which quickly spreads through the the mixture, resulting in the formation of an incipiently fused clinker. The clinker, after cooling, is crushed and milled to give a finely divided product which may be directly used in stock feed mixtures in sufficient amounts to supply desired nutritional requirements of iron, phosphorus and manganese. The clinker also may be used in the production of iron and manganese salts.

In a typical example 1000 grams of pyrolusite, containing 84.4% $MnO_2$, was milled into a powder. 302 grams of ferrophosphorus containing 24.8% P was similarly milled and mixed with the powdered pyrolusite. The mixture was placed in a brick lined trough and a gas flame applied at one end until the mixture ignited. Reaction took place with incipient fusion at red heat and spread throughout the charge in about three minutes. After cooling and milling, the clinker product analyzed 24.2% iron oxides, 5.5% $SiO_2$, 14.4% $P_2O_5$ and 55% MnO. Approximately 84% of the iron and 99% of the manganese were in the ferrous and manganous state and were soluble in phosphoric acid.

In another example using the same materials and proportions but carrying out the reaction in the presence of carbon dioxide gas, the resulting clinker had 87.4% of its iron content in the ferrous state and substantially all of its manganese in the manganous state.

The composition of the clinker products will vary to some extent depending on the impurities present in the pyrolusite and ferrophosphorus starting materials, and on the proportions. Generally the clinker will contain 5 or 6% $SiO_2$, and a small amount of the iron will be in the ferric state, depending on the amount of excess oxygen introduced with the reactants and the effect of oxygen introduced by contact with air during the reaction period. Substantially all of the manganese will be in the manganous state. The $P_2O_5$ will be present in the form of phosphate radicals combined with either or both the manganese and iron. It is not known to what extent the phosphate radicals are distributed between the iron and manganese, but this is not important since the desired result is accomplished by making the iron and manganese available for stock feeds or for the production of soluble phosphate salts.

Each of the above clinker products was further treated with phosphoric acid to produce water soluble phosphate salt mixtures. 150 grams of the milled clinker were treated with 790 grams of 40% phosphoric acid in a Hobart mixer, using a steam heated Monel bowl and stainless steel paddle. After mixing for about four hours, the product obtained was a substantially white, free-flowing powder which was largely soluble in water.

With the first clinker treated under ordinary atmospheric conditions the resulting product analyzed approximately:

| | Percent |
|---|---|
| $Mn(H_2PO_4)_2 \cdot 2H_2O$ | 63.5 |
| $Fe(H_2PO_4)_2 \cdot 2H_2O$ | 14.6 |
| $Fe(H_2PO_4)_3$ | 14.4 |

With the second clinker, produced and treated in a carbon dioxide atmosphere, the resulting product analyzed:

| | Percent |
|---|---|
| $Mn(H_2PO_4)_2 \cdot 2H_2O$ | 67.2 |
| $Fe(H_2PO_4)_2 \cdot 2H_2O$ | 21.0 |
| $Fe(H_2PO_4)_3$ | 4.0 |

Both of these products resulting from the phosphoric acid treatment of the clinker contain some free phosphoric acid and all of the impurities present in the starting materials. In the second case where both the clinker production and the acid treatment were carried out in a non-oxidizing atmosphere a larger proportion of the iron is in the water soluble ferrous phosphate salt. The water soluble manganous and ferrous phosphate salts may be separated, if desired, and further purified by crystallization.

By controlling the conditions as illustrated in the above examples, a fairly broad range in the composition of the products can be obtained without departing from the principle of converting the two substantially inert raw materials, ferrophosphorus and pyrolusite, into highly useful reaction products.

In another example 3000 grams of finely divided pyrolusite (85.7% $MnO_2$) was mixed with 942 grams of milled ferrophosphorus (24.0% P) and the mixture placed in a mold made from loose bricks to form a four inch cube of the mixture. The mixture was ignited on the surface with a gas flame. After the reaction started, it spread slowly until the entire mass was reacted in a period of about ten minutes. A maximum temperature of over 1160° C. developed during the reaction. The reacted mass was a black, hard but brittle porous clinker. The mass was crushed and milled to give a product having the approximate screen analysis:

| | Percent |
|---|---|
| 20–40 mesh | 35 |
| 40–60 mesh | 20 |
| 60–80 mesh | 8 |
| 80–100 mesh | 4 |
| 100–200 mesh | 15 |
| T200 mesh | 18 |

This milled product analyzing approximately 55.5% MnO, 24.0% FeO and 14.5% $P_2O_5$ in substantially available form is highly suitable for direct inclusion in stock feeds as a supplemental source of the manganese and iron and phosphorus nutritional requirements.

A reaction product obtained by reacting finely divided pyrolusite and ferrophosphorus in molecular proportions of $11MnO_2$ to $2Fe_2P$ analyzed 13.2% $P_2O_5$, 58.8% MnO, and 16.7% Fe. The phosphorus, manganese, and iron in the reaction product were present in phosphoric acid soluble form.

In another test where the starting materials were employed in molecular proportions of $5MnO_2$ to $2Fe_2P$, an acid soluble reaction product containing 17.4% $P_2O_5$, 53.2% MnO, and 22.0% Fe was obtained.

In another case a low grade manganese ore containing only 56% $MnO_2$ was reacted was ferrophosphorus in molecular proportions of $5MnO_2$ to $2Fe_2P$. The reaction in this case was not self-sustaining but required external heating throughout the reaction period. The reaction product contained 39.2% MnO, all of which was soluble in phosphoric acid.

Where the reacting mixture contains a sufficient quantity of manganese dioxide and ferrophosphorus, the reaction is exothermic and requires only sufficient heat to start the reaction. In these instances it is also necessary that there be a sufficient amount of ferrophosphorus in relation to the manganese dioxide. Thus, in utilizing manganese ores of not less than 80% manganese dioxide content and ferrophosphorus of 24% phosphorus content, the proportions of $11MnO_2$ to $2Fe_2P$ is approximately on the dividing line of producing a self-supporting reaction. With lower ratios down to less than $5MnO_2$ to $2Fe_2P$, the reaction is entirely self-supporting and therefore exothermic. Where the reaction materials are of lower grade, the concentration of the reactants may not be sufficient to maintain the reaction. However, the reaction may always be carried out by supplying sufficient external heat.

The new composition is quite useful in the production of rustproofing baths for iron and steel articles. For this purpose it is preferably combined with phosphoric acid, as for example, one part by weight of the clinker composition with two parts by weight of phosphoric acid, on a dry basis, dilution with water being carried out as desired.

The new clinker product is also especially suitable for use in fertilizer compositions to furnish the small amounts of manganese necessary for the proper growth of plants in manganese deficient soils.

The foregoing detailed description is given for clearness of understanding only and no unnecessary limitations should be understood therefrom as modifications will be obvious to those skilled in the art.

I claim:

1. As a new composition of matter the reaction product of ferrophosphorus and manganese dioxide wherein the mol ratio of manganese to iron is within the range of 5 to 8 and 11 to 4.

2. As a new composition of matter the reaction product of pyrolusite and ferrophosphorus where the pyrolusite contains at least 80% $MnO_2$ and the ferrophosphorus contains from 18 to 27% phosphorus.

3. As a new composition of matter the reaction product of pyrolusite and ferrophosphorus where the pyrolusite contains at least 80% $MnO_2$ and the ferrophosphorus contains from 18 to 27% phosphorus and the proportions are of the order of 9 mols $MnO_2$ to 2 mols of $Fe_2P$.

4. A fused clinker product resulting from the reaction of from about 5 to 11 mols of manganese dioxide and 2 mols of ferrophosphorus.

5. A fused clinker product resulting from the reaction of about 9 mols of manganese dioxide and 2 mols of ferrophosphorus.

6. A fused clinker product resulting from the reaction of about 9 mols of manganese dioxide and 2 mols of ferrophosphorus where the fused product contains manganous compounds equivalent to at least 50% calculated as MnO and ferrous iron of at least 18% calculated at FeO.

7. An animal feed including the product of claim 1.

8. The method of producing available phosphorus and manganese compounds which comprises reacting approximately 9 mols of pyrolusite with 2 mols of ferrophosphorus.

WILLARD H. WOODSTOCK.

References Cited in the file of this patent

UNITED STATES PATENTS

| Number | Name | Date |
|---|---|---|
| 714,330 | Reese | Nov. 25, 1902 |
| 724,142 | Stevenson | Mar. 31, 1903 |
| 1,660,661 | Willard et al. | Feb. 28, 1928 |
| 1,866,879 | Darsey | July 12, 1932 |
| 2,372,476 | Elmslie | Mar. 27, 1945 |
| 2,480,103 | Fux | Aug. 30, 1949 |
| 2,489,758 | Funn | Nov. 29, 1949 |

OTHER REFERENCES

Parrish et al.: Artificial Fertilizers, vol. I (1927), Van Nostrand Co., New York, pages 284 to 287.